G. M. JOSEPH.
GREASE CUP.
APPLICATION FILED SEPT. 2, 1909.

1,047,068.

Patented Dec. 10, 1912.

WITNESSES:
Carrie E. Kleinfelder.
Daniel Webster, Jr.

INVENTOR
George M. Joseph
BY Cyrus N. Anderson
ATTORNEY.

UNITED STATES PATENT OFFICE.

GEORGE M. JOSEPH, OF CAMDEN, NEW JERSEY, ASSIGNOR TO LINDHOLM METAL STAMPING COMPANY, A CORPORATION OF NEW JERSEY.

GREASE-CUP.

1,047,068. Specification of Letters Patent. Patented Dec. 10, 1912.

Application filed September 2, 1909. Serial No. 515,923.

*To all whom it may concern:*

Be it known that I, GEORGE M. JOSEPH, a citizen of the United States, residing in the city of Camden, county of Camden, State of New Jersey, have invented certain new and useful Improvements in Grease-Cups, of which the following is a specification.

My invention relates to grease cups and more particularly to the class of cups consisting of two parts or members which are adapted to be separated. Its object is to provide means which will permit the ready engagement or securing together of the members of the cup but which is adapted to prevent accidental movement of the parts to cause their separation.

A convenient embodiment of my invention is illustrated in the accompanying drawings to which reference may be had for a clearer comprehension of my invention.

It will be understood that changes in the details of construction may be made without departing from the scope of my invention.

Figure 1:
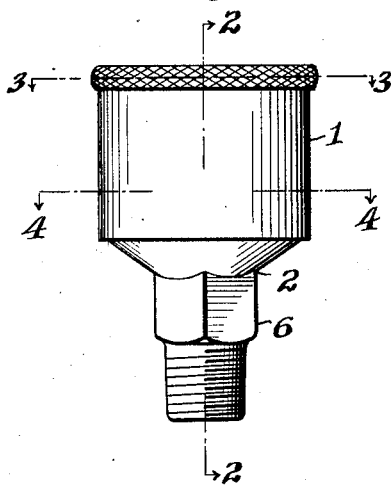
Figure 2:
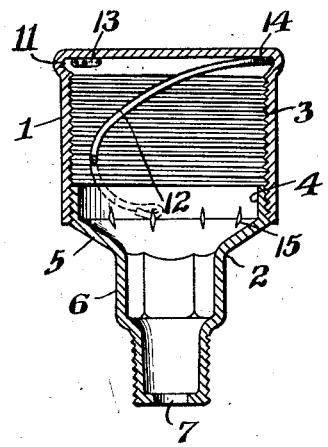
Figure 5:
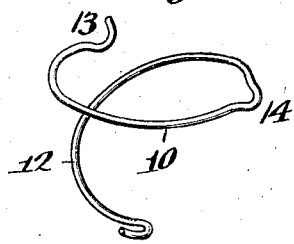
Figure 3:
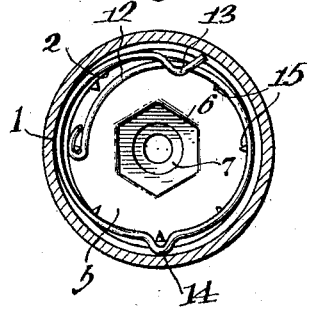
Figure 4:
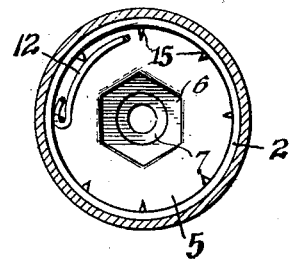

In the drawings:—Figure 1 is a side elevation of a cup to which my invention is applied; Fig. 2 is a longitudinal section of the same; Fig. 3 is a transverse section on the line 3—3 of Fig. 1; Fig. 4 is a transverse section on the line 4—4 of Fig. 1; and Fig. 5 is a separate view of the spring shown in Figs. 2, 3 and 4.

In the drawings I have shown a cup consisting of the body member 1 and the throat or closing member 2. The member 1 is screw threaded internally as shown at 3. The member 2 is provided with a relatively large section 4 which is screw threaded externally for engagement with the screw threads 3 interiorly of the member 1 as shown in Fig. 2. The section 4 is connected by a frusto-conical shaped portion or section 5 to the reduced oil or grease discharging end portion 6 of the cup. The oil or grease escapes in the usual way through the opening or vent 7. The member 2 may be screwed any distance desired into the member 1 of the cup.

In the use of a grease cup of the character shown in the drawings, the members 1 and 2 thereof are liable to separate by reason of vibration or some other accidental cause. To prevent such separation the spring located in the cup is employed. The spring has a semicircular or spiral portion 10 seated in a groove or seat 11 formed at the angle or junction between the sides and bottom of the member 1 of the cup, and a portion 12 extended spirally and upwardly into contact with the section 4. The end of said spring extension would be seated usually in the angle between the sections or portions 4 and 5. The direction of coil of the spring is the same as that in which the member 2 is turned to screw it into the member 1 to secure the members of the cup together, so that the resistance offered by the spring to the turning of the member 2 in a direction to secure the members 1 and 2 together is so slight that it may be diregarded. When the member 2 is turned in such direction the spring yields; but when turned in the opposite direction to separate the members the spring is prevented from yielding by the side of the member 1 acting as an abutment for its extended portion. This results in causing the end of the spring to press with greater force against the side of the section 4 and in also causing it to exert a considerably increased thrust against the frusto-conical section or portion 5 adjacent to its line of junction with the portion 4. The spring, therefore, may be said to act as a lock to prevent the accidental turning of the members 1 and 2 relatively to each other to separate them, but not to prevent such movement when it is desired to separate them for any purpose.

The portion 10 of the spring is provided at its end with a bend 13,—the end of the spring resting or pressing against the bottom of the seat or groove 11 so as to hold the portion of the spring adjacent to the bend slightly removed from the bottom of its seat. The spring is also provided with a bend 14 which rests against the bottom of the seat or groove 11. The portion of the spring upon one side of the bend 14 is held slightly removed from the bottom of the seat 11. The extended portion 12 of the spring leads off from the opposite side of the bend 14. By holding portions of the spring from the bottom of the groove 11 as indicated, it is tensioned and therefore is retained more firmly and securely in place.

If the member 1 instead of the member 2 be turned to connect or disconnect the said members, the spring seated in the member 1 will be moved with respect to the member which remains stationary, and it will be noted that the coil of the spring extends in a direction opposite to that in which the member 1 is turned to connect the members and in the same direction as the member 1 is turned to disconnect the said members.

The action of the spring is the same whether the one or the other of the members is turned. It is to be understood that the coil of the spring begins at the bend 13 and extends therefrom in the direction of the length of the wire.

If desired shallow notches 15 may be provided in the angle between the portions 4 and 5 of the member 2 of the cup. When present these notches increase the resistance offered by the spring to the relative movement between the members 1 and 2 of the cup. They may or may not be employed depending upon the amount of resistance it is desired that the spring shall exert to prevent such relative movement.

Having thus described my invention, I claim:—

1. The combination of a grease cup, consisting of two members having screw threaded connection with each other, and a spiral spring seated in one of said members and having a portion in contact with the other member, the said spring yielding when the members are screwed together and being prevented from yielding by contacting with the inside of the cup when the members are screwed in the opposite direction to disconnect them, whereby the said spring offers but slight resistance to movement in one direction and greater resistance to movement in the opposite direction.

2. The combination of a grease cup, consisting of two members adapted to be connected together by relative movement in one direction and disconnected by relative movement in the opposite direction and one of said members having a seat for a wire coil and the other of said members having an inclined portion, with a spiral spring in one of said members and having a coil seated in the seat formed therein and having a portion in contact with the other of said members and the said spring yielding when the said members are moved relatively to each other to connect them and being prevented from yielding when the members are moved relatively to each other in the opposite direction to disconnect them whereby the said spring is caused to exert an increased thrust against the said inclined portion to prevent accidental relative movement of said members in a direction to disconnect them.

3. In a grease cup, the combination of a stationary member and a movable member having movable connection with the said stationary member, a spiral spring seated in the said movable member and having a portion which extends spirally of the said movable member and into contact with the said stationary member, the spiral or twist of the said member extending in the direction in which the said movable member is turned to connect the members of the said cup, whereby the resistance offered by the said spring to movement of the said movable member to disconnect the members of the said cup is greater than when the said movable member is moved in the opposite direction to connect the said members.

4. The combination of a grease cup, consisting of two separable members, and a spring having a portion seated in one of said members in a plane substantially at right angles to the axis of the cup and a portion extending spirally and longitudinally of said cup, the end of the spiral portion of said spring being in contact with the other of said members and the said spring yielding in the direction of its spiral bend to permit easy relative movement of the said members in one direction to secure them together and prevented from yielding in the opposite direction by contact of the spiral portion with the interior surface of a member of the cup whereby the friction between the end of the spiral portion of the spring and the member of the cup against which it contacts is increased and the resistance offered to relative movement of the said members of the cup to separate them thereby increased.

5. The combination of a grease cup comprising two members which are adapted to be connected together by relative movement in one direction and to be disconnected from each other by relative movement in the opposite direction with a wire spring seated inside of one of said members and extending spirally into the other of said members and into contact therewith, the said spiral portion of said spring being permitted to yield when the said relative movement of said members is in a direction to connect them together and the said spiral portion being pressed against the inside of the cup and thereby prevented from yielding when the relative movement of the said members is in a direction to disconnect them whereby the friction between the end of the spiral portion of the said spring and the member of the cup against which it contacts is increased so that accidental relative movement of the said members of the cup to disconnect them is prevented.

In testimony that I claim the foregoing as my invention, I have hereunto signed my name this 31st day of Aug., A. D. 1909.

GEORGE M. JOSEPH.

In the presence of—
S. SALOME BROOKE,
CARRIE E. KLEINFELDER.

Copies of this patent may be obtained for five cents each, by addressing the "Commissioner of Patents, Washington, D. C."